(12) United States Patent
Chang (10) Patent No.: US 8,436,937 B2
(45) Date of Patent: May 7, 2013

(54) CAMERA MODULE HAVING SOCKET WITH PROTRUSION AND METHOD FOR ASSEMBLING THE SAME

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 375 days.

(21) Appl. No.: 12/780,942

(22) Filed: May 17, 2010

(65) Prior Publication Data

US 2011/0063496 A1 Mar. 17, 2011

(30) Foreign Application Priority Data

Sep. 11, 2009 (CN) .......................... 2009 1 0306873

(51) Int. Cl.
*H04N 5/225* (2006.01)
(52) U.S. Cl.
USPC ........ 348/374; 348/224.1; 348/274; 348/290; 348/342
(58) Field of Classification Search .................. 348/374, 348/224.1, 274, 290, 342
See application file for complete search history.

(56) References Cited

U.S. PATENT DOCUMENTS

| | | | |
|---|---|---|---|
| 2001/0050717 A1* | 12/2001 | Yamada et al. | 348/340 |
| 2002/0131782 A1* | 9/2002 | Yamaguchi et al. | 396/429 |
| 2003/0137595 A1* | 7/2003 | Takachi | 348/340 |
| 2009/0021635 A1* | 1/2009 | Cheng | 348/374 |

* cited by examiner

*Primary Examiner* — Usman Khan
(74) *Attorney, Agent, or Firm* — Altis Law Group, Inc.

(57) ABSTRACT

A camera module includes a circuit board having a supporting surface, a socket fixed on the supporting surface of the circuit board and defining a receiving space, an image sensor received in the receiving space, and a lens group optically coupled with the image sensor. The receiving space of the socket has an entrance and an internal surface. A block protrusion is formed on the internal surface. The block protrusion includes a first ramp extending from the internal surface to a center portion of the receiving space. The lens group includes a plurality of optical components. A slope parallel to the first ramp is formed on one of the optical components. At least part of the lens group is received in the receiving space and blocked by the block protrusion, with the first ramp resisting against the slope. A method for assembling the camera module is also provided.

10 Claims, 6 Drawing Sheets

CAMERA MODULE HAVING SOCKET WITH PROTRUSION AND METHOD FOR ASSEMBLING THE SAME

BACKGROUND

1. Technical Field

The present disclosure relates to a camera module.

2. Description of Related Art

A typical camera module includes a holder, a barrel, a number of optical elements (e.g., lenses and infrared-cut filters), and an image sensor mounting on a circuit board. In assembly of the camera module, the optical elements are received in the barrel in sequence, and the barrel is then threaded into the holder. Thus, the structure of the camera module is complicated, and is not conveniently assembled and disassembled.

Therefore, a new camera module is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

Figure 1:
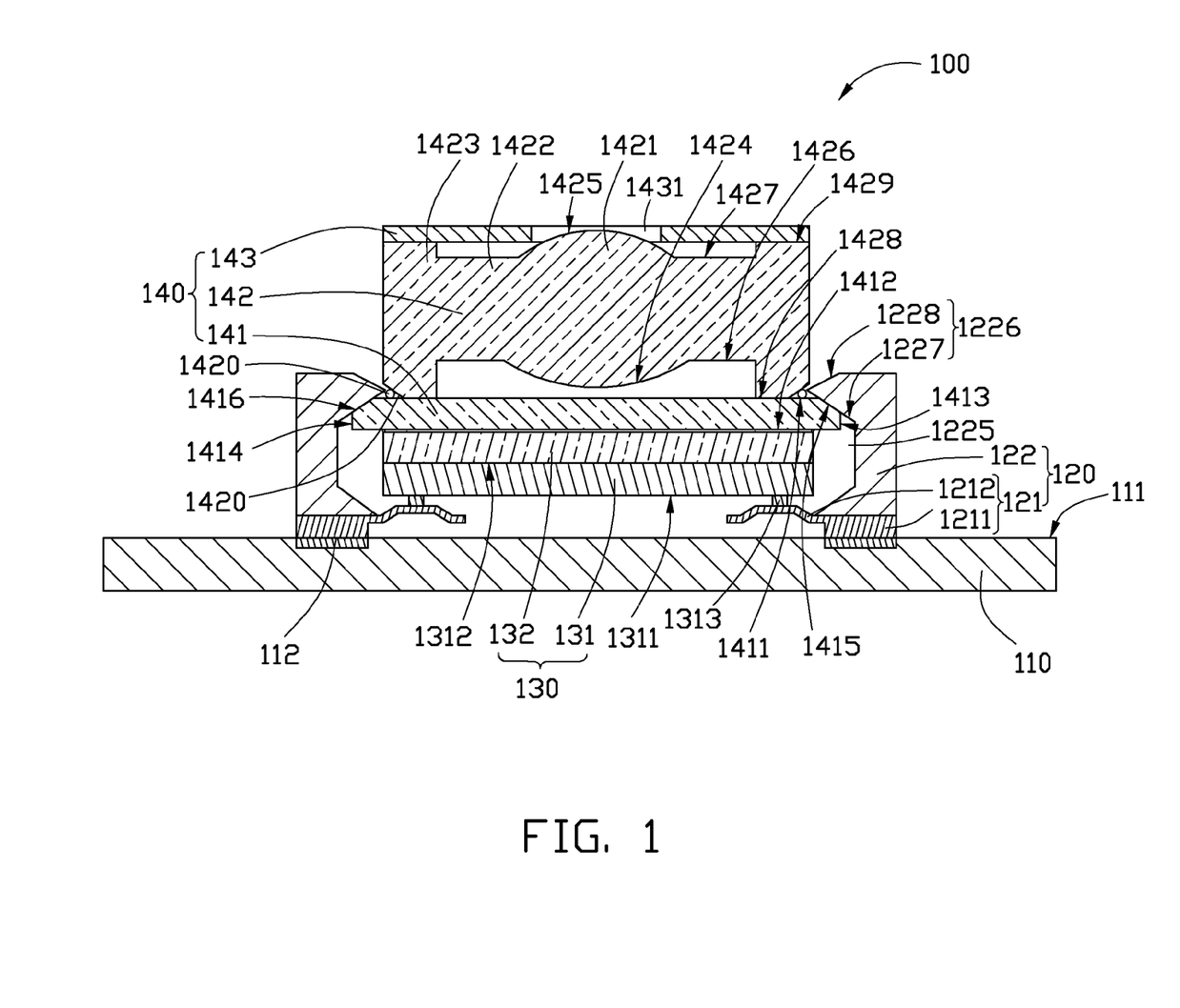
Figure 2:
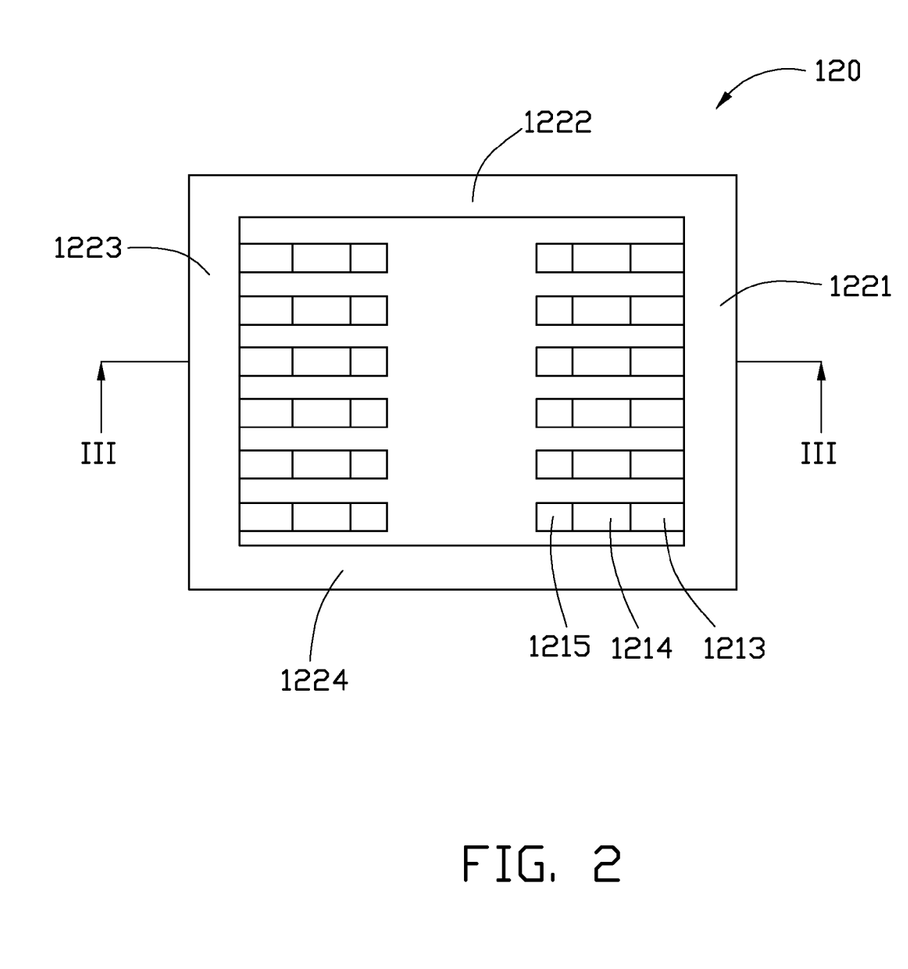
Figure 3:
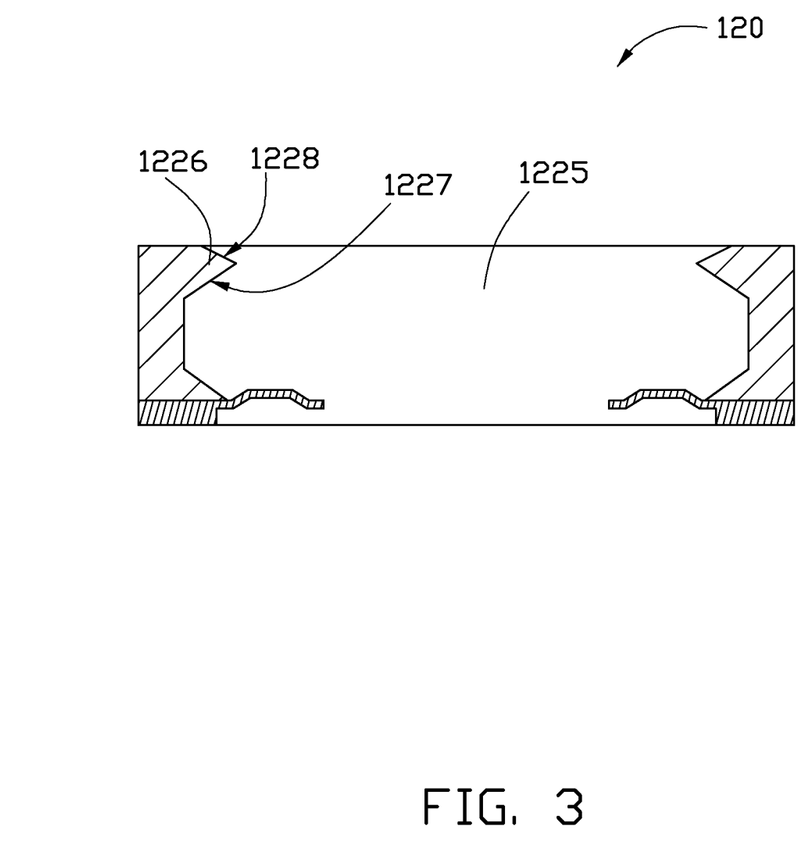

Referring to FIGS. 1 to 3, a camera module 100 according to a first embodiment of the present disclosure includes a circuit board 110, a socket 120, an image sensor 130, and a lens group 140.

The circuit board 110 is square and includes a supporting surface 111. A plurality of soldering pads 112 are formed on the supporting surface 111 and electrically connect to an embedded internal circuit (not shown) of the circuit board 110.

The socket 120 includes a base 121 and a frame 122 connected with the base 121. The base 121 includes a soldering portion 1211 and a plurality of elastic metal supporting portions 1212 parallel with each other. The soldering portion 1211 are respectively aligned with and welded to the soldering pads 112 of the circuit board 110 such that the socket 120 is fixed on the supporting surface 111 of the circuit board 110. In one embodiment, the socket 120 can be made of metal materials such as copper or silver. The supporting portions 1212 are configured for supporting the image sensor 130 and electrically connecting the image sensor 130 to the circuit board 110. Referring also to FIG. 2, in one embodiment, the base 121 is a square frame. The supporting portions 1212 are configured to perpendicularly extend from two opposite sides of the square frame 121 to a center portion of the frame. The supporting portions are spaced from each other and approximately parallel with the supporting surface 111.

Each supporting portion 1212 is an arch shape and includes a first segment 1213, a second segment 1214, and a third segment 1215 connected respectively. The first segment 1213 connects with the soldering portion 1211 and extends far from the supporting surface 111 at a first predetermined angle. The second segment 1214 extends in parallel with the supporting surface 111 with one end connecting to the first segment 1213. The third segment 1214 extends from the other end of the second segment 1214 towards the supporting surface 111 at a second predetermined angle without contacting the circuit board 110. As shown in FIG. 1, a top surface of the second segment 1214 is slightly higher than the top surface of the soldering portion 1211 and electrically connected the image sensor 130 to the circuit board 110.

The frame 122 includes a first wall 1221, a second wall 1222, a third wall 1223, and a fourth wall 1224 connected perpendicularly end to end respectively. The first, second, third, and fourth walls 1221, 1222, 1223, and 1224 define a space 1225.

At least one block protrusion 1226 is formed on an internal surface of each one of the first, second, third, and fourth walls 1221, 1222, 1223, and 1224 for fixing at least portion of the lens group 140. Each block protrusion 1226 extends from the entrance of the frame 122 towards a center portion of the frame 122. In one embodiment, the block protrusion 1226 is an annular protrusion parallel with the circuit board 110. In an alternative embodiment, the block protrusion 1226 includes a plurality of spaced protrusion units arranged along a circumference of the entrance to the frame 122.

In this embodiment, the block protrusions 1226 are formed on the internal surfaces of the opposite first and third walls 1221 and 1223. Each block protrusion 1226 is triangular prism-shaped and extends along one of the internal surfaces of the first and the third walls 1221 and 1223. In one embodiment, the block protrusions 1226 are positioned near the entrance of the frame 120 in parallel with the circuit board 110. Each block protrusion 1226 includes a first ramp 1227 and a second ramp 1228 adjacent to the first ramp 1227. As shown in FIG. 1, the first ramp 1227 is lower than the second ramp 1228. That is, the first ramp 1227 is closer to the circuit board 110 than the second ramp 1228. Both the first ramp 1227 and the second ramp 1228 are slanted with the supporting surface 111 of the circuit board 110.

The image sensor 130 is received in the space 1225 of the frame 122 and is configured for sensing an image of an object via the lens group 140. The image sensor 130 can be a complementary metal oxide semiconductor (CMOS) sensor or a charge coupled device (CCD) sensor. The image sensor 130 includes an image sensor substrate 131 and a glass shield 132.

The image sensor substrate 131 includes a first surface 1311 and a second surface 1312 opposite to the first surface 1311. A plurality of connecting pads 1313 is formed on the first surface 1311 spatially corresponding to the supporting portions 1212 and configured for an electrical connection to the supporting portions 1212, respectively. The glass shield 132 covers the second surface 1312 to protect the image sensor substrate 131.

The lens group 140 is to guide the light from the object to the image sensor 130. In this embodiment, the lens group 140 is optically coupled with the image sensor 130. The lens group 140 includes an infrared (IR)-cut filter 141, an object lens 142, and a light shield 143.

The IR-cut filter 141 is to filter infrared light emitting from the object to protect the image sensor 130. The IR-cut filter 141 is positioned on the glass shield 132 and is received in the space 1225. In one embodiment, the IR-cut filter 141 is square and includes a top surface 1411 and a bottom surface 1412 opposite to the top surface 1411. A first side surface 1413, a second side surface 1414 opposite to the first side surface 1413, a first slope 1415 adjacent to both the top surface 1411 and the first side surface 1413, and a second slope 1416 adjacent to both the top surface 1411 and the second side surface 1414. The first side surface 1413 is positioned to near the first wall 1221 and the second side surface 1414 is positioned to near third wall 1223. In this embodiment, the IR-cut filter 141 is wider than the glass shield 132 such the first and the second slopes 1415 and 1416 are correspondingly blocked by the first ramps 1227 the block protrusions 1226. The bottom surface 1412 is arranged to face the second surface 1312 of the glass shield 132. The IR-cut filter 141 is spaced in parallel with the image sensor 130 and fixed thereon by glue (not labeled).

The object lens 142 is fixed on the top surface 1411 of the IR-cut filter 141 and is configured for directing light from an external object to the image sensor 130. In one embodiment, the object lens 142 is a square biconvex lens and includes a circular optical portion 1421, a connecting portion 1422 surrounding the optical portion 1421, and a supporting portion 1423 connected the connecting portion 1422. In one embodiment, the object lens 142 is H-shaped in a side view.

The optical portion 1421 includes a first optical surface 1424 and a second optical surface 1425 opposite to the first optical surface 1424. The first and the second optical surfaces 1424 and 1425 can be a spherical convex surface or an aspherical convex surface.

The connecting portion 1422 is annular and includes a first connecting surface 1426 adjacent to the first optical surface 1424 and a second connecting surface 1427 adjacent to the second optical surface 1425.

The supporting portion 1423 includes a first supporting surface 1428 and a second supporting surface 1429. In this embodiment, a plurality of glue openings 1420 define in the first supporting surface 1428 facing the IR-cut filter 141. The object lens 142 can be fixed on the IR-cut filter 141 by filling glue 1421 in the glue openings 1420. In one embodiment, a distance from the first supporting surface 1428 to the second supporting surface 1429 is approximately equal to or greater than 3 millimeters.

The light shield 143 is square and configured to define an aperture opening in its center. The light shield 143 is fixed on the second supporting surface 1429 of supporting portion 1423 by glue and substantially co-axial with the object lens 142. In this embodiment, as shown in FIG. 1, the first optical surface 1424 facing the aperture opening 1431 is partly received in the aperture opening 1431 and lower than an outer surface of the light shield 143. The light shield 143 is made of plastic panel or SOMA. In alternative embodiment, a protection film is applied on part of the surface of the object lens 142 except for the second optical surface 1425 to depress a diffusing light.

Because the first and the second slopes 1415 and 1416 of the IR-cut filter 141 are blocked by the first ramps 1227 of the block protrusions 1226, and the image sensor substrate 131 is elastically supported by the supporting portions 1212. The image sensor 130 and the block protrusions 1226 and the supporting portions 1212 tightly clasp the lens group 140. Therefore, the camera module 100 does not need a further lens barrel to receive and fix the image sensor 130 and the lens group 140. Thus, a volume of the camera module 100 correspondingly decreases.

Figure 4:
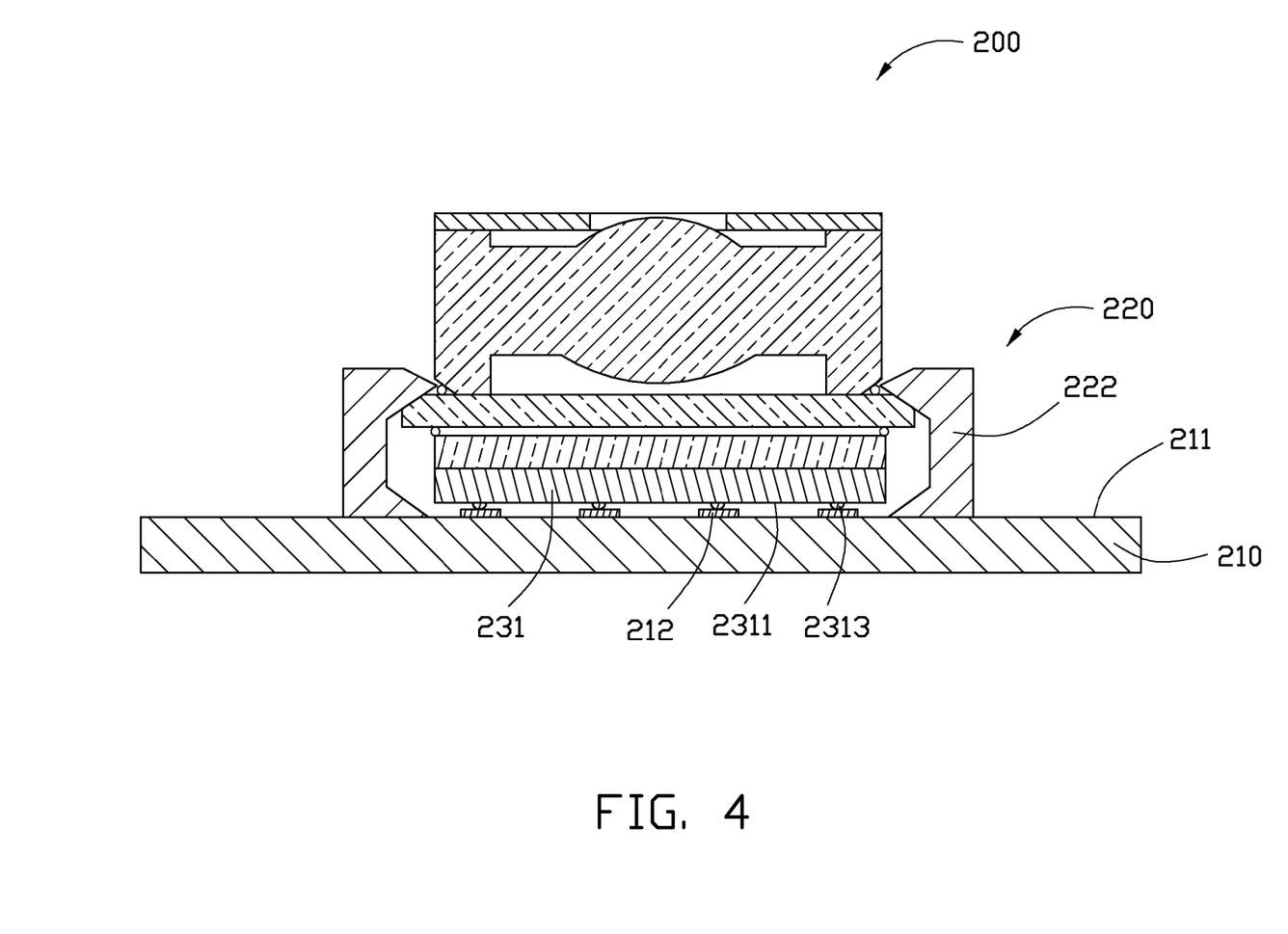

Referring to FIG. 4, a camera module 200 according to a second embodiment of the present disclosure is shown. The camera module 200 is similar to the camera module 100 except that a supporting surface 211 of a circuit board 210 includes a plurality of soldering pads 212 facing an image sensor substrate 231. A plurality of contacting terminals 2313 spatially corresponding to the soldering pads 212 are formed on a first surface 2311 of the image sensor substrate 231 facing the supporting surface 211. In this embodiment, the socket 220 only includes a fixing frame 222 directly attached to the supporting surface 211 of the circuit board 210. Because the socket 220 of the camera module 200 has no base for supporting the image sensor substrate 231, the image sensor substrate 231 directly electrically connects to the circuit board 210 via the soldering pads 212 and the contacting terminals 2313. Therefore, the camera module 200 is simpler than the camera module 100.

Figure 5:
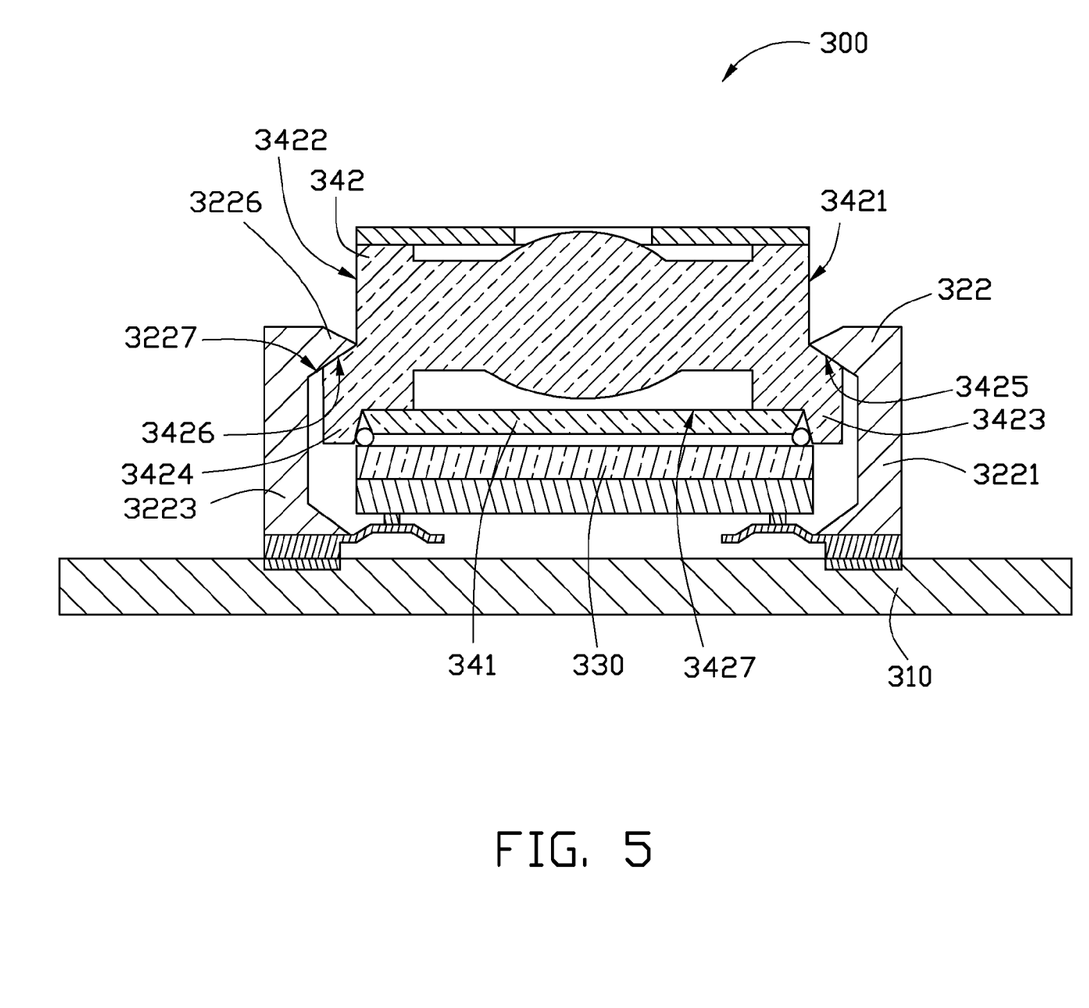

Referring to FIG. 5, a camera module 300 according to a third embodiment of the present disclosure is shown. The camera module 300 is similar to the camera module 100 except that an object lens 342 is wider than an IR-cut filter 314 and an image sensor 330. The object lens 342 includes a first side surface 3421 facing a first wall 3221 of a frame 322 and a second side surface 3422 facing a third wall 3223 of the frame 322. A first ear protrusion 3423 having a first slope 3425 is formed on the first side surface 3421. A second ear protrusion 3424 having a second slope 3426 is formed on the second side surface 3422.

The first slope 3425 and the second slope 3426 spatially correspond to a first ramp 3227 of block protrusions 3226 of the frame 322. In this embodiment, the first ear protrusion 3423 and the second ear protrusion 3424 partly extend from a first supporting surface of the object lens 342 towards the circuit board 310 to define a space for receiving the IR-cut filter 341. Away from an image sensor 330, a top surface 3427 of the IR-cut filter 341 contacts with the first supporting surface of the object lens 342. Because the ear protrusions 3423 and 3424 are formed on side surfaces of the object lens 340, the camera module 300 is simple.

Figure 6:
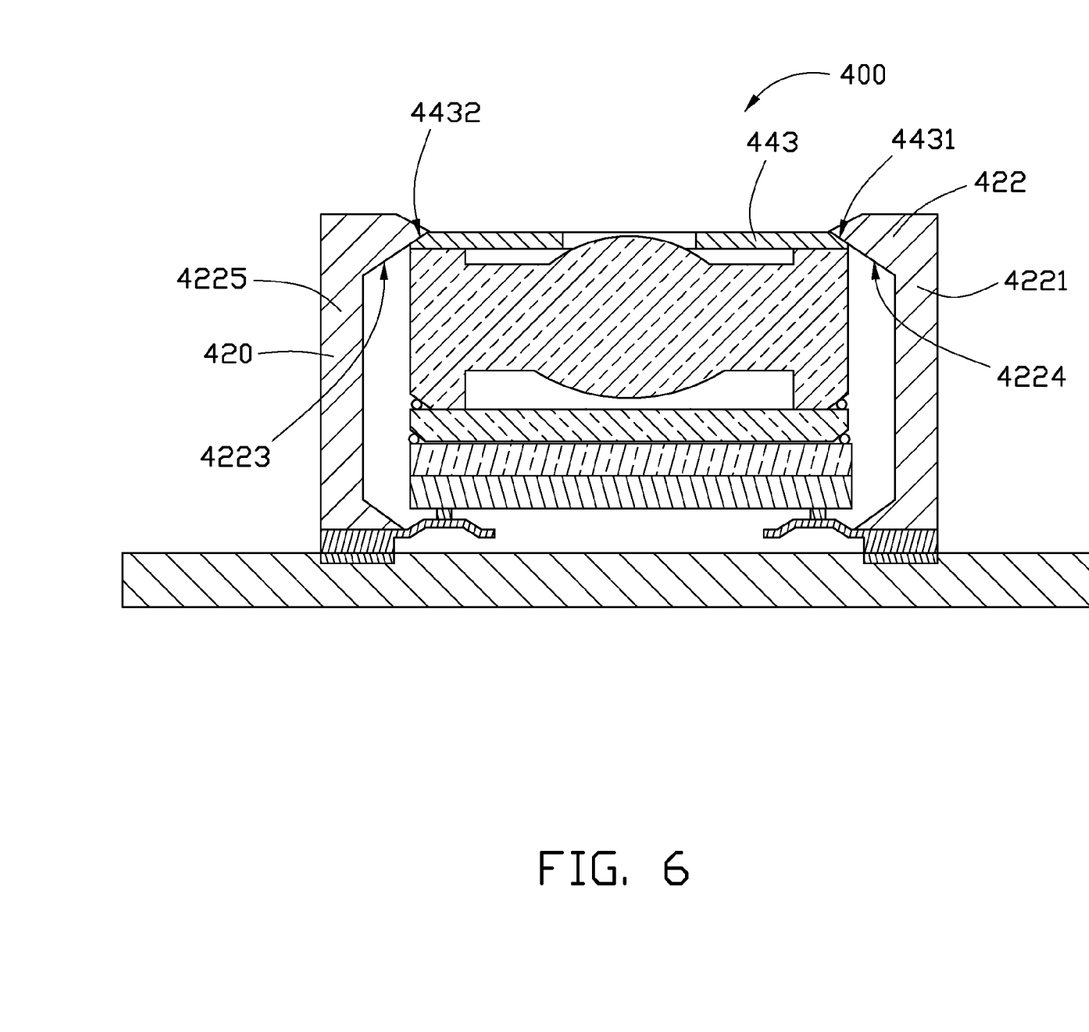

Referring to FIG. 6, a camera module 400 according to a fourth embodiment of the present disclosure is shown. The camera module 400 is similar to the camera module 100 except that a first slope 4431 is formed on a first edge of a light shield 443 corresponding to a first ramp 4224 of a first wall 4221 of the frame 422. A second slope 4432 is formed on a second edge of the light shield 443 corresponding to a second ramp 4223 of the third wall 4225 of the frame 422. A lens group is completely received in a socket 420.

Referring also to FIG. 1, an assembly method of above described camera module is also provided. In detail, an assembly method of the camera module 100 includes the following steps:

1) A circuit board 110 and a socket 120 as above described are provided. The circuit board 110 can be a rigid circuit board or a flexible circuit board. The socket 120 defines a receiving space 1225. The block protrusions 1226 are formed on internal surfaces of the first and the third walls 1221 and 1223. Each block protrusion 1226 includes a first ramp 1227 and a second ramp 1228 adjacent to the first ramp 1227. The first ramp 1227 extends far from the circuit board 110.

2) The socket 120 is fixed on the circuit board 110. The soldering pads of the supporting surface 111 is aligned to the soldering portion 1211 of the base 121 of the socket 120, and then the soldering pads 112 are soldered to the soldering portions 1211 by surface mounting technology (SMT). If the socket 120 includes only the frame 122, the socket 120 can also be adhered to the circuit board 110 by glue.

3) An image sensor 130 and lens group 140 as described above are provided, the lens group 140 includes slopes 1415 corresponding to the first ramp 1227.

4) The image sensor 130 and lens group 140 are fixed to each other. The image sensor 130 is fixed with the lens group 140 and is optically coupled to the lens group 140. The IR-cut filter 141, the object lens 142, and the light shield 143 are co-axially arranged in that order. The IR-cut filter 141 is fixed to glass shield 132 of the image sensor 130 such that the image sensor 130 and the lens group 140 are fixed to be one body.

5) The fixed image sensor 130 and lens group 140 are inserted into a space 1225 of the socket 120. The slopes 1415 and 1416 of the IR-cut filter 141 of the lens group 140 are arranged to resist with the ramps 1227 of block protrusions 1226 of the socket 120. Therefore, the image sensor 130 is elastically supported by the supporting portion 1212 to let the image sensor 130 and the lens group 140 be clamped by the socket 120.

In above assembly method of the camera module 100, because the lens group 140 and the image sensor 130 can be inserted into the socket 120 and fixed therein, it is clear that there needs no high temperature surface mounting process to package the image sensor 130 and the lens group 140 together by a high temperature surface mounting device. Thus, a deformation of the image sensor 130 and the lens group 140 in high temperature can correspondingly avoid.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A camera module comprising:
a circuit board comprising a supporting surface;
a socket fixed on the supporting surface of the circuit board, the socket comprising a receiving space with an entrance at an opposite side thereof to the circuit board and an internal surface in the receiving space, a block protrusion formed on the internal surface, the block protrusion comprising a first ramp extending from the internal surface to a center portion of the receiving space at an opposite end thereof to the circuit board;
an image sensor; and
a lens group optically coupled with the image sensor, the lens group comprising a plurality of optical components, a slope parallel to the first ramp being formed on one of the optical components, one end of the lens group together with the image sensor being inserted into the receiving space through the entrance with the image sensor received in the receiving space, and at least part of the lens group being received in the receiving space and blocked by the block protrusion with the first ramp resisting against the slope,
wherein the optical components comprise an infrared-cut (IR-cut) filter, an object lens, and a light shield stacked in that order above the image sensor, the IR-cut filter is wider than the object lens and the image sensor, the IR-cut filter is received in the receiving space, the object lens and the light shield are located above the receiving space, the IR-cut filter comprises a top surface and a side surface, and the slope is formed on the IR-cut filter and is connected between the top surface and the side surface of the IR-cut filter.

2. The camera module of claim 1, wherein the block protrusion further comprises a second ramp adjacent to the first ramp, and the second ramp extends from the internal surface to a center portion of the space.

3. The camera module of claim 1, wherein both the first ramp and the second ramp are slanted relative to the supporting surface of the circuit board.

4. The camera module of claim 1, wherein the block protrusion is triangular prism-shaped.

5. The camera module of claim 1, wherein the circuit board comprises a plurality of soldering pads formed on the supporting surface, and the socket comprises a base having a soldering portion welded to the soldering pads of the circuit board.

6. The camera module of claim 5, wherein the base comprises a plurality of elastic supporting portions for elastically supporting the image sensor and electrically connecting the image sensor to the circuit board.

7. The camera module of claim 6, wherein each of the supporting portions extends from an internal side of the base and has an arch shape.

8. The camera module of claim 6, wherein the supporting portions are spaced from each other and approximately parallel with the supporting surface.

9. A camera module comprising:
a socket defining a receiving space, the receiving space having an entrance and an internal surface, at least one block protrusion protruding from the internal surface to a center portion of the receiving space;
an image sensor received in the receiving space; and
a lens group optically coupled with the image sensor, the lens group comprising a plurality of optical components, at least one cutout being formed in one of the optical components, the at least one block protrusion resisting against the one of the optical components at the at least one cutout to fix the lens group to the socket;
wherein the at least one block protrusion comprises at least one ramp slanted towards a bottom of the socket, and the one of the optical components comprises at least one slope formed at the cutout and abutting the at least one ramp; and
wherein the optical components comprise an infrared-cut (IR-cut) filter, an object lens, and a light shield stacked in that order above the image sensor, the IR-cut filter is received in the receiving space, and the object lens and the light shield are located above the receiving space; and the IR-cut filter comprises a top surface and a plurality of side surfaces, and the at least one slope is formed on the IR-cut filter and is connected between the top surface and the side surfaces of the IR-cut filter.

10. A camera module comprising:
a socket defining a receiving space, the receiving space having an entrance and an internal surface, at least one block protrusion protruding from the internal surface to a center portion of the receiving space;
an image sensor received in the receiving space; and
a lens group optically coupled with the image sensor, the lens group comprising a plurality of optical components, at least one cutout being formed in one of the optical components, the at least one block protrusion resisting against the one of the optical components at the at least one cutout to fix the lens group to the socket;
wherein the at least one block protrusion comprises at least one ramp slanted towards a bottom of the socket, and the one of the optical components comprises at least one slope formed at the cutout and abutting the at least one ramp and
wherein the optical components comprise an infrared-cut (IR-cut) filter, an object lens, and a light shield stacked in that order above the image sensor, the IR-cut filter is received in the receiving space, the object lens is partly received in the receiving space, and the light shield is located above the receiving space, the object lens comprises an optical portion, a connection portion surrounding the optical portion, a supporting portion connecting the connection portion and contacting the IR-cut filter and the light shield, a first ear protrusion and a second ear protrusion, the first ear protrusion and the second ear protrusion respectively protrude from two opposite side surfaces of the supporting portion, and the at least one slope is formed on the first ear protrusion and the second ear protrusion.

* * * * *